Patented Nov. 13, 1934

1,980,384

UNITED STATES PATENT OFFICE 1,980,384

SEPARATION OF META CRESOL FROM META CRESOL-PARA CRESOL MIXTURES

Frederick Comte, Webster Groves, Mo., assignor to Monsanto Chemical Company, St. Louis, Mo., a corporation of Delaware No Drawing. Application November 25, 1933, Serial No. 699,711

9 Claims. (Cl. 260—154)

This invention relates to the separation of meta cresol from a mixture of meta and para cresols and it contemplates an improvement on the method described in British Patent 107,961 to Georges Auguste Darzens wherein sodium acetate is utilized to effect the separation of the cresols.

The cresols which are obtained in commerce are by-products of the destructive distillation of coal and are recovered in their crude form physically admixed with phenol as well as several xylenols. Due to the differences in boiling points it is possible to separate phenol, ortho-cresol and most of the xylenols, from the crude mixture However, meta cresol cannot be separated from para cresol by fractional distillation due to the fact that the boiling points of these substances are practically identical. For this reason other methods of separation have in the past been employed. Among these methods are those which depend upon the formation of a solid addition compound with one of the constituents from which the other constituent may be separated by physical means, after which the separated addition compound is resolved into its components.

The Darzens method consists in admixing fused sodium acetate with a mixture of meta and para cresols which may contain some ortho cresol. The acetate combines with the meta cresol forming a crystalline addition product from which the liquid para fraction is separated by draining. In order to recover the meta cresol from the crystalline product Darzens adds water whereupon the addition compound is decomposed into its constituents. The resultant aqueous mixture is stripped of meta cresol by steam distillation or solvent extraction after which it is evaporated to dryness, care being exercised to produce a completely dehydrated acetate before it is introduced again into the process. The meta cresol so produced has a purity of 76%–81%.

This procedure has certain disadvantages which render its utilization on a commercial scale difficult. First, the product obtained is not sufficiently rich in meta cresol to meet the requirement of pure meta cresol of commerce and must be processed further before it may be marketed. Furthermore, the process necessitates a sodium acetate which is pulverulent as well as anhydrous, whereas the addition compound must be decomposed with the aid of water whereby an aqueous solution of acetate results. Thus, in order to use the acetate again it is necessary to separate the meta cresol which is dissolved in the aqueous fraction and subsequently to evaporate the solution to dryness in order to produce an acetate of the required physical form. These operations are difficult and costly due, on the one hand, to the tendency of sodium acetate to undergo thermal decomposition, and on the other to the known hygroscopic properties of acetate. Moreover, diluents or solvents for cresol must be employed in order to produce a clean acetate-meta cresol crystal which is substantially free from liquid para cresol. These solvents must be dried carefully before reuse to insure the successful combination of the acetate with the meta cresol.

The object of the present invention is to obviate and minimize the disadvantages of the foregoing process whereby a good yield of practically pure meta cresol is obtainable.

I have found that the acetate-meta cresol addition product may be freed of para contamination and resolved quantitatively into its components, preferably after washing the same free of occluded para cresol, by subjecting the same to an elevated temperature in the absence of water. The anhydrous acetate so formed is in excellent physical form for immediate reuse and a meta cresol product of better than 97% purity is produced directly.

In practicing my process it is advantageous, for the purpose of the resolution, to suspend the addition compound in an inert, non-aqueous solvent for meta cresol. Various solvents may be employed, such as benzol, carbon tetra chloride and the like, although I prefer to employ a cut of petroleum naphtha whose boiling range is 90°–100° C. which is sufficiently removed from that of meta cresol to enable one to separate the same easily by fractional distillation. A naphtha having a substantially higher boiling range may be employed successfully and has the advantage of lowering the solvent losses. The decomposition of the addition product into its components is effected quantitatively at moderately elevated temperatures. The suspended acetate is readily separable by decantation or filtration after which it is suited for immediate reuse. Its recovery is practically quantitative. The solution of cresol and hydrocarbon solvent is fractionated, the cresol thus obtained being of a marketable purity for most purposes without further purification, as by crystallization or repetition of the acetate treatment, and the solvent may be employed again in the process.

The following example will serve to illustrate an application of the principles of my invention:

336 kilos of finely ground sodium acetate, which has been dried to a constant weight at 130° C. and which contains less than .1% moisture, is charged into a vessel containing 150 liters of a dry petroleum naphtha solvent having a boiling range of 90°–100° C., after which there is added 216 kilos of a commercially available meta-para mixture of cresols which upon analysis has approximately the following ratio of cresols:

|  | Per cent |
|---|---|
| Meta cresol | 66 |
| Para cresol | 33 |
| Ortho cresol and xylenols | 1 |

The solvent assures a degree of fluidity of the thick mass to render the same easily manipulatable.

The mixture is agitated at approximately 45° C. for 4 to 6 hours. Thereafter the agitation is interrupted and the temperature is permitted to fall to room temerature (approximately 28°–32° C.). After 12 to 15 hours the mixture is filtered and the crystals are washed thoroughly with successive portions of fresh, dry solvent, preferably of substantially the same composition as that employed in the previous step of the process. One thus obtains 503 kilos of crystals substantially free from para cresol in a form that may be resolved readily into their constituents: sodium acetate and meta cresol, by heating with 1000 liters of solvent for 15 minutes at approximately the boiling temperature (96° C.), filtering the hot suspension, again heating the residue thus obtained with 1000 liters of fresh solvent for 15 minutes and again filtering, and finally heating the resultant residue with 750 liters of additional solvent at the boiling temperature and again filtering. The combined filtrates are distilled to separate the solvent from the meta cresol. One thus obtains 102.0 kilos of meta cresol having a melting point of 10.4° C. and a purity of 97.3%. If desired, the fractionated solvent may be washed with aqueous alkali in order to effect more complete removal of the meta cresol. However, since the meta cresol which remains in the solvent is not lost but is returned to the process, alkali treatment is not essential to the successful operation of the process. Moreover, the solvent so washed must be dried for reuse.

The crystalline addition compound is composed of two molar parts of meta cresol and five molar parts of sodium acetate. On this basis I employ approximately 20% excess of sodium acetate based on the meta cresol present in the original mixture. The recovery of meta cresol is approximately 70% of that which is present in the mixture. This recovery does not vary greatly over a comparatively wide range of meta-para cresol mixtures. The presence of other phenols reduces the recovery but appears not to affect the purity of the product. The ratio of cresols in the filtrate is approximately 33.6 meta cresol, 65.3 para cresol and 1.1 ortho cresol and xylenols.

In lieu of a petroleum naphtha solvent of 90°–100° C. boiling range one may employ a cut which boils somewhat higher, say one which has a range of 140°–150° C. Benzol and similar aromatic hydrocarbons may be employed. In general I have obtained better results and a purer meta cresol with petroleum hydrocarbons. It is to be noted that the decomposition of the acetate-meta cresol product may be effected in the presence of other non-aqueous solvents for cresol or even in the absence of a solvent. It is also to be observed that one may employ different solvents at different stages of the process. Thus, the decomposition of the acetate addition compound may be effected in one solvent whereas the formation of the addition compound and the washing operation whereby the crystals are freed from the occluded para cresol may be effected by means of another solvent. In general, non-aqueous liquids which are compatible with meta cresol are suitable.

The number of treatments whereby the decomposition of the addition compound is effected is optional. Most of the meta cresol is recovered in the first step and additional steps need not be employed, particularly in view of the fact that no materials are thereby lost but, on the contrary, the materials remain in the process, although the efficiency of the recovery and the output of the apparatus are affected. It is perfectly feasible to effect satisfactory decomposition of the addition compound in one stage, particularly if one operates at higher temperatures by employing a higher boiling solvent or pressure sustaining equipment including a pressure filter press for effecting the separation of the solid acetate from the ligroin cresol mixture at a relatively higher temperature.

Alternatively, the resolution of the addition compound may be effected by simply heating the same, preferably at reduced pressures, whereby the cresol distills off; or by distilling off the cresol with the aid of vapors of an inert, non-aqueous solvent such as benzol, petroleum naphtha, etc., which may be superheated to effect more rapid and complete volatilization of the cresol.

Although I have described one embodiment of my invention and have indicated various modifications and alternatives, it is to be understood that the invention is not limited to the specific embodiment set forth herein but extends to widely varied phenolic compositions containing meta cresol, conditions of temperature, ratio of reacting and solvent substances, as well as the nature of the solvents, without departing from the spirit of the present invention which contemplates the preparation of meta cresol of inordinate purity, is resolved into its components at elevated temperatures and without the employment of aqueous reagents.

What I claim is:

1. In the separation of meta cresol from a liquid phenolic mixture containing the same, whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature while avoiding the presence of water.

2. The method as defined in claim 1 and further characterized in that the resolution is effected at elevated temperatures with the aid of vapors of an inert, non-aqueous substance which in liquid form is a solvent for meta cresol.

3. In the separation of meta cresol from a liquid phenolic mixture containing the same whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature in the presence of an inert, non-aqueous substance which substance under ordinary temperature conditions is a liquid and a solvent for meta cresol.

4. In the separation of meta cresol from a phenolic mixture containing the same whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature in the presence of an inert, non-aqueous liquid which is a solvent for meta cresol.

5. In the separation of meta cresol from a phenolic mixture containing the same whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature in the presence of a hydrocarbon solvent.

6. In the separation of meta cresol from a phenolic mixture containing the same whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature in the presence of petroleum naphtha.

7. In the separation of metal cresol from a liquid phenolic mixture containing the same whereby a solid sodium acetate-meta cresol addition product is separated from the liquid phenolic mixture, the step of resolving the solid addition compound into its constituents and recovering the sodium acetate in an anhydrous form which comprises heating the addition product to its decomposing temperature in the presence of a non-aqueous liquid which is a solvent for meta cresol whereby the addition compound is resolved into its constituents, and subsequently separating the insoluble fraction from the liquid fraction.

8. The process as described in claim 7 and further characterized in that the solvent is a petroleum naphtha having a boiling point range which is sufficiently removed from the boiling point of meta cresol to enable one to separate the meta cresol from the naphtha by fractional distillation.

9. The cyclic process for separating meta cresol from a liquid phenolic mixture containing the same which comprises forming the solid sodium acetate-meta cresol addition product, separating the addition product from the residual liquid fraction, resolving the addition product into its two constituents in the presence of a petroleum naphtha solvent, separating the solvent containing the meta cresol from the sodium acetate residue, recovering the meta cresol from the solvent by fractional distillation, and returning the anhydrous sodium acetate to the process to be used again.

FREDERICK COMTE.